Oct. 16, 1951 N. O. MYKLESTAD 2,571,279
SHOCK ABSORBER
Filed June 3, 1949 2 Sheets-Sheet 1
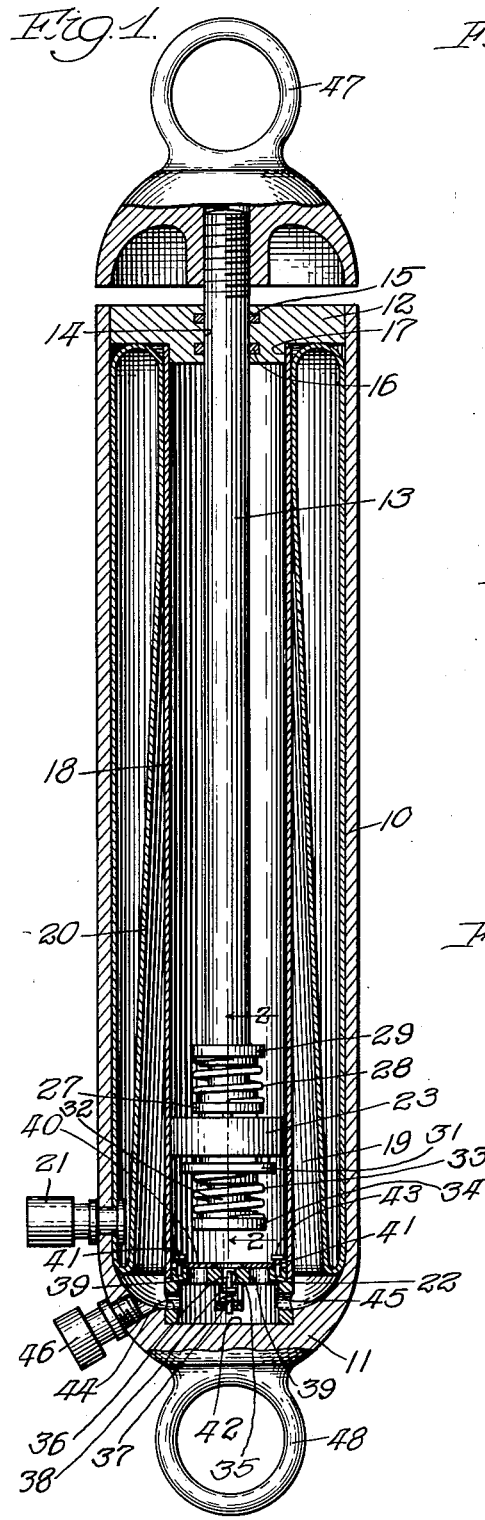
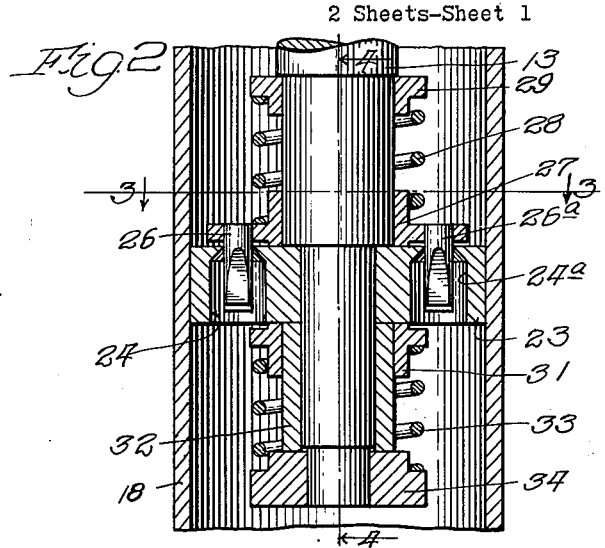
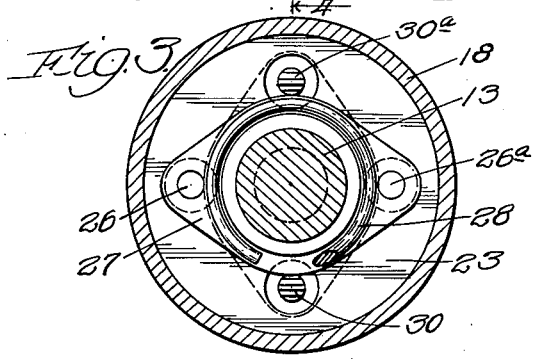
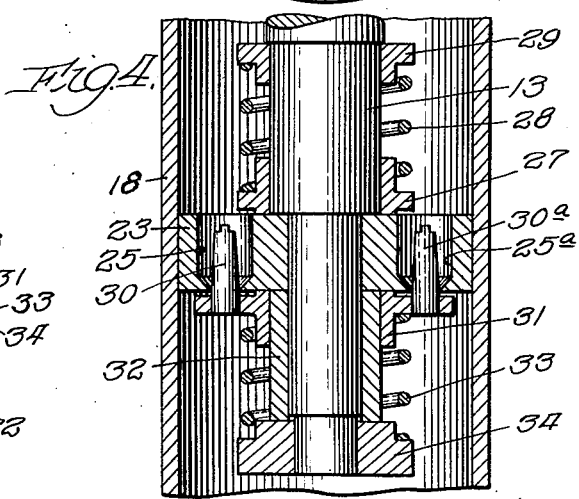
Inventor:
Nils O. Myklestad,
By Schroeder, Merriam,
Hofgren & Brady, Attys.

Oct. 16, 1951 — N. O. MYKLESTAD — 2,571,279
SHOCK ABSORBER
Filed June 3, 1949 — 2 Sheets-Sheet 2

Inventor:
Nils O. Myklestad,
By Schroeder, Merriam,
Hofgren & Brady, Attys.

Patented Oct. 16, 1951

2,571,279

UNITED STATES PATENT OFFICE 2,571,279

SHOCK ABSORBER

Nils O. Myklestad, Urbana, Ill.

Application June 3, 1949, Serial No. 96,931

3 Claims. (Cl. 188—88)

This invention relates to a shock absorber and more particularly to a hydraulic shock absorber of the piston and cylinder type.

It is the general object of this invention to product a hydraulic shock absorber of new and improved construction.

It is a more specific object of the invention to produce a hydraulic shock absorber which includes a fluid piston and cylinder device and in which the flow of cushioning oil from one side of the piston to the other side is accurately regulated.

Another object of the invention is to provide a means for regulating the flow of cushioning oil from one side to the other side of a hydraulic piston in response to changes of pressure on either side of the piston and also in response to the velocity of movement of the piston.

It is a further object of this invention to provide metering pins movable relative to a hydraulic piston for regulating the flow of cushioning oil from one side of the piston to the other, the action of the pins being responsive to the pressure differential on each side of the piston and to the velocity of movement of the piston.

Other and further features of the invention will be apparent from the following specification and drawings in which:

Fig. 1 is a view, broken away for clarity of illustration, of a shock absorber embodying the invention;

Fig. 2 is a vertical section along line 2—2 of Fig. 1;

Fig. 3 is a horizontal section along line 3—3 of Fig. 2;

Fig. 4 is a view like Fig. 2 taken from a position 90° therefrom, generally along line 4—4 of Fig. 2.

Figure 5:
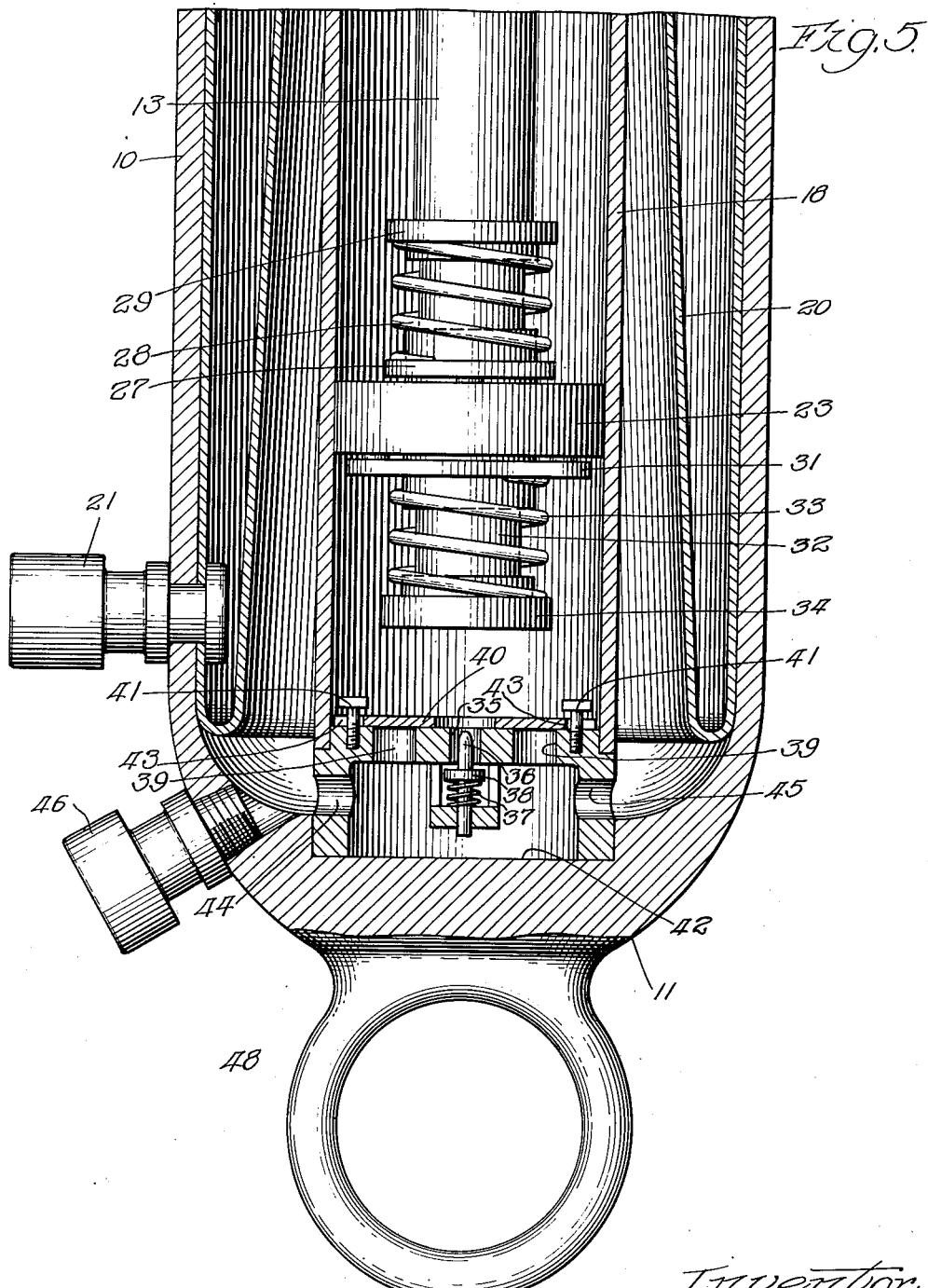
Fig. 5 is an enlarged detailed view of the lower portion of Fig. 1.

While the invention has been disclosed and described herein in a particular embodiment, it is not intended that the invention is to be limited thereby to the specific disclosure made. On the contrary, it is intended to cover all modifications and alternative constructions falling within the spirit and scope of the invention as defined in the appended claims.

Referring now to the drawings, the shock absorber comprises a cylindrical casing 10 having its lower end closed by an integral end section 11 and having its upper end closed by an end plate 12. A piston rod 13 extends through a circular opening 14 in the end plate in which opening sealing rings 15 and 16 are provided to prevent oil leakage through the plate.

Secured to a boss 17 formed on the underside of the end plate 12 is a second cylinder 18 having a diameter less than the diameter of the cylindrical casing to define a fluid reservoir portion 19 therebetween. Located in the reservoir 19 is a fluid impervious sack 20 preferably constructed of neoprene or other synthetic rubber material and into which air or other gas under pressure may be introduced through the fitting 21.

The lower end of the cylinder 18 is closed by an end plate 22 spaced from the end section 11, the end plate 22 being provided with certain openings and valves hereinafter to be described.

Secured to the piston rod 13 is an annular piston 23 provided with a plurality of orifices extending therethrough. Certain of the orifices coact with metering devices hereinafter explained with movement of the piston in one direction and certain other of the orifices coact with other metering devices when the piston moves in the opposite direction.

In the specific embodiment shown a total of four orifices are employed, two of which 24 and 24a are called into operation with the downward movement of the piston (as viewed in Fig. 1), while a second pair of orifices 25 and 25a are called into operation when the piston moves upwardly. Located in each of the orifices 24 and 24a is a metering pin 26 and 26a, the metering pins being secured to a collar 27 slidable on the piston rod 13 and urged against the piston by a compression spring 28. The spring 28 has one end bearing against the collar 27 and the other end of the spring bears against a collar 29 fixed to the piston rod 13.

Associated with the orifices 25 and 25a are metering pins 30 and 30a, each of which is secured to a collar 31 slidable upon a tubular member 32 fixed to the piston rod 13. The collar 31 is urged against the piston 23 by a second compression spring 33 bearing thereagainst and against a second collar 34 fixed to the lower end of the piston rod.

Each of the metering pins and each of the orifices cooperate to determine the rate of fluid flow through the orifices depending upon the position of the metering pins relative thereto. For this purpose, each orifice is provided with a tapered opening at one end through which a tapered metering pin extends. Each metering pin is tapered so as to have oppositely facing inclined flat sides and oppositely facing tapered curved sections, the curved sections blending into the flat sides substantially as shown in the drawings. With the metering pins in the position shown in the drawings each of the orifices is completely closed. As the metering pins are withdrawn away from the orifices, the permissible amount of fluid flow therethrough progressively increases until, with the metering pins completely withdrawn from the orifices, the entire area is available for flow.

The end plate 22 is provided with a central opening 35 in which is located a metering pin 36. The lower portion of the opening 35 is tapered in the same manner as the orifices previously described. The metering pin is urged upwardly into a position closing the opening by means of a spring 37. A collar 38 is fixed to the metering pin 36 and is adapted to seat against the end plate 22 to seal the opening 35.

The end plate is also provided with a plurality of openings 39 therethrough closed by a disc-like check valve 40. The disc valve 40 is constructed of light material so that it may be moved upwards between guides 41 with increase in the fluid pressure within the space 42 relative to the fluid pressure within the cylinder 18 and below piston 23. Each of the guides 41 is provided with a projecting top 43 to limit the upward movement of the disc valve.

Openings 44 and 45 are provided in the end plate 22 to connect the space 42 with the fluid reservoir 19. The fluid reservoir 19 outside of sack 20, the space 42, and the cylinder 18 are completely filled with a hydraulic fluid which may be introduced thereto through the fitting 46. A fitting 47 is secured to the upper end of the piston rod and may be attached to one part of a device having two parts to be connected together by the shock absorber, and a fitting 48 is secured to the end section 11 and may be attached to the other part of the device.

In operation, a downward force on the fitting 47 is transmitted thereby to the piston rod 13 to cause the piston rod, and hence the piston, to move downwardly within the cylinder 18. With downward movement of the piston 23, hydraulic fluid must flow through the piston into the space thereabove. In addition, hydraulic fluid must flow through the opening 35 and thus via the space 42 and openings 44 and 45 into the fluid reservoir 19, the amount of the latter flow being determined by the cross sectional area and the amount of movement of the piston rod 13. With but a small force the metering pins 26 and 26a will be unseated only slightly from the orifices 24 and 24a to permit a relatively slow flow of fluid through the orifices and into the space above the piston, while simultaneously the metering pin 36 will be depressed against the tension of the spring 37 to permit flow of fluid through the orifice 35 and into the reservoir 19. As the force subsides and the piston returns to its original position (under the action of a spring or other means connected to the two relatively movable parts of the device to which the shock absorber is attached), the spring 28 seats the metering pins 26 and 26a to block flow of fluid through the orifices 24 and 24a while the metering pins 30 and 30a are unseated from orifices 25 and 25a to permit a slow flow of return fluid therethrough on the return stroke. The slight difference in pressure during the return movement of the piston is sufficient to unseat the disc valve 40 and permit flow of fluid through the openings 39 from the reservoir 19.

The shape and size of the metering pins may be varied as desired to satisfy any required relationship between the velocity of motion of the piston and the pressure difference between the top and bottom of the piston, this latter being a direct measure of the damping effect of the shock absorber. When the relative velocity between the piston 23 and the cylinder 18 becomes very great, the metering pins 26 and 26a move entirely free of the orifices 24 and 24a thereby opening those orifices completely and precluding any further increase in pressure.

The stiffness of the spring 28, of course, controls the degree by which the orifices 24 and 24a are opened with any specific difference in pressure. I prefer to so construct the device so that the strength of the spring 28 relative to that of the spring 37 is such that the pressure drop through the opening 35 is always somewhat greater than that through the orifices 24 and 24a. Thus, I insure that there will always be a positive pressure on top of the piston so that no air will be drawn in through the sealing rings 15 and 16.

The full area of the opening 35 is in the same proportion to the total area of the orifices 24 and 24a as the volume of oil which must flow through the opening 35 is to the total volume of oil which must flow through the orifices 24 and 24a. Stated in another way, the area of the opening 35 is to the sum of the areas of the orifices 24 and 24a as the square of the diameter of the piston rod 13 is to the square of the diameter of the cylinder 18 minus the square of the diameter of the piston rod 13.

I claim:

1. A shock absorber comprising a substantially cylindrical casing, a cylinder mounted in the casing and spaced from the walls thereof to define a fluid reservoir, a fluid impervious gas tight sack in the reservoir, means for introducing gas under pressure into the sack, a piston reciprocable in the cylinder and having a plurality of orifices therein extending through the piston, a piston rod connected to the piston and extending therethrough, a collar slidably mounted on the rod on one side of the piston, a metering pin mounted on the collar and adapted to open and close an orifice, a spring urging the collar against the piston to urge the pin toward movement in a closing direction, a second collar slidably mounted on the rod on the other side of the piston, a second metering pin mounted on the second collar and adapted to open and close another orifice, a spring urging the second collar against the piston to urge the second pin toward movement in a closing direction, a fluid passage between the cylinder and the reservoir, and a pressure responsive valve in the passage.

2. A shock absorber comprising a cylinder, a piston reciprocable in the cylinder and having a plurality of orifices therein extending through the piston, a piston rod connected to the piston, a plurality of metering pins on one side of the piston each adapted to open and close an orifice therein, said metering pins being mounted for movement relative to the piston, resilient means urging the pins toward movement in a closing direction, a second plurality of metering pins on the other side of the piston, each adapted to open and close other orifices and said second plurality of metering pins being mounted for movement relative to the piston, resilient means urging the second plurality of pins towards movement in a closing direction, a fluid reservoir, a passage connecting the reservoir to the cylinder and a pressure responsive valve in said passage and adapted to open and close said passage, the effective opening of said passage divided by the total effective openings of orifices controlled by one of said pluralities of metering pins being equal to the square of the diameter of the piston rod divided by the difference between the square of the diameter of the cylinder and the square of the diameter of the piston rod.

3. A shock absorber comprising a cylinder, a piston reciprocable in the cylinder and having a plurality of orifices therein extending through the piston, a piston rod connected to the piston, a plurality of metering pins on one side of the piston each adapted to open and close an orifice therein, said metering pins being mounted for movement relative to the piston, spring means urging the pins toward movement in a closing direction, a second plurality of metering pins on the other side of the piston, each adapted to open and close other orifices and said second plurality of metering pins being mounted for movement relative to the piston, spring means urging the second plurality of pins toward movement in a closing direction, a fluid reservoir, a passage connecting the reservoir to the cylinder having an orifice therein, a metering pin movable in said orifice and adapted to close the same, and spring means urging said last named metering pin toward movement in a direction closing the orifice, said last mentioned spring means being of greater strength than the first mentioned spring means, whereby the pressure drop through said last mentioned orifice is greater than the pressure drop through said first mentioned orifices, said last mentioned metering pin being movable to a position opening the orifice against the tension of the spring means with increase in pressure in said cylinder.

NILS O. MYKLESTAD.

REFERENCES CITED

The following references are of record in the file of this patent:

UNITED STATES PATENTS

| Number | Name | Date |
|---|---|---|
| 1,145,983 | French | July 13, 1915 |
| 2,062,670 | Luebkert | Dec. 1, 1936 |
| 2,324,058 | Boor et al. | July 13, 1943 |
| 2,410,176 | Magrum | Oct. 29, 1946 |

FOREIGN PATENTS

| Number | Country | Date |
|---|---|---|
| 29,906 | Great Britain | Dec. 11, 1913 |
| 683,212 | France | Feb. 25, 1930 |